United States Patent
Tsai et al.

(10) Patent No.: US 10,817,028 B2
(45) Date of Patent: Oct. 27, 2020

(54) SEALED LIGHT-EMITTING KEYPAD MODULE FOR MOBILE COMPUTING DEVICES

(71) Applicant: ZEBRA TECHNOLOGIES CORPORATION, Lincolnshire, IL (US)

(72) Inventors: I-Heng Tsai, Taipei (TW); Yanmin Mao, Brampton (CA); Huang Chih Huang, Taoyuan (TW); Timothy Kyowski, Kitchener (CA)

(73) Assignee: Zebra Technologies Coproration, Lincolnshire, IL (US)

(*) Notice: Subject to any disclaimer, the term of this patent is extended or adjusted under 35 U.S.C. 154(b) by 0 days.

(21) Appl. No.: 16/297,177

(22) Filed: Mar. 8, 2019

(65) Prior Publication Data

US 2020/0285285 A1    Sep. 10, 2020

(51) Int. Cl.
*F21V 7/04*    (2006.01)
*G06F 1/16*    (2006.01)
*F21V 8/00*    (2006.01)

(52) U.S. Cl.
CPC ........... *G06F 1/1662* (2013.01); *G02B 6/001* (2013.01)

(58) Field of Classification Search
CPC .... G02B 6/001; G02B 6/0035; G02B 6/0051; H01H 13/7006; H01H 13/7013; H01H 2219/052; G06F 3/0202; G06K 7/10881

USPC .......................................................... 362/602
See application file for complete search history.

(56) References Cited

U.S. PATENT DOCUMENTS

| | | | |
|---|---|---|---|
| 6,040,822 A * | 3/2000 | Decker | F21V 33/0052 341/22 |
| 8,186,889 B2 * | 5/2012 | Masuda | H04M 1/22 349/56 |
| 9,437,379 B2 * | 9/2016 | Shiu | H01H 13/83 |
| 2014/0151211 A1 * | 6/2014 | Zhang | H01H 13/702 200/5 A |

* cited by examiner

*Primary Examiner* — Matthew J. Peerce (57) ABSTRACT

A keypad module for a mobile computing device includes: a base member including: a base plate having (i) a lower surface configured to engage with a keypad mount of the mobile computing device, (ii) an opposing upper surface, and (iii) a light receiving region at the lower surface; a light pipe riser extending from the base plate and having a light emission region at an input surface of the keypad module; wherein the base plate and the light pipe riser define a light path from the light receiving region to the light emission region, configured to receive light from the mobile computing device and emit the light at the light emission region; and a keypad assembly supported on the upper surface of the base plate, the keypad assembly including a plurality of keys exposed at the input surface of the keypad module.

19 Claims, 6 Drawing Sheets

SEALED LIGHT-EMITTING KEYPAD MODULE FOR MOBILE COMPUTING DEVICES

BACKGROUND

Mobile computing devices are deployed in a wide variety of environments. Certain applications of such devices may require different input assemblies, such as keypads with varying layouts. Accommodating the installation and removal of multiple input assemblies can be costly and time-consuming. Further, keypads may be required to be guarded against entry of fluids, dust and the like, further increasing the cost and complexity of their assembly.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a keypad module for a mobile computing device, the keypad module comprising: a base member including: a base plate having (i) a lower surface configured to engage with a keypad mount of the mobile computing device, (ii) an opposing upper surface, and (iii) a light receiving region at the lower surface; a light pipe riser extending from the base plate and having a light emission region at an input surface of the keypad module; wherein the base plate and the light pipe riser define a light path from the light receiving region to the light emission region, configured to receive light from the mobile computing device and emit the light at the light emission region; and a keypad assembly supported on the upper surface of the base plate, the keypad assembly including a plurality of keys exposed at the input surface of the keypad module.

Additional examples disclosed herein are directed to a keypad module for a mobile computing device, comprising: a base member including a base plate having (i) a lower surface configured to engage with a keypad mount of the mobile computing device, (ii) an opposing upper surface, and (iii) an opening configured to receive a keypad interface of the mobile computing device; a keypad assembly supported on the upper surface of the base plate, the keypad assembly including: a detection subassembly configured to engage with the keypad interface via the opening in the base plate for communicating detected key presses to the keypad interface; a frame joined to an inner perimeter of the base plate surrounding the detection subassembly to encase the detection subassembly; a plurality of buttons sealed to an upper surface of the frame for exposure to an input surface of the keypad module; and a bezel joined to outer perimeter of the base plate surrounding the frame, and including a set of openings for the plurality of buttons.

Further examples disclosed herein are directed to a mobile computing device, comprising: a device housing defining a keypad mount, the keypad mount including a keypad interface having a connector and a light emitter; a keypad module including: a base member including: a base plate having (i) a lower surface configured to engage with the keypad mount, (ii) an opposing upper surface, and (iii) a light receiving region at the lower surface; a light pipe riser extending from the base plate and having a light emission region at an input surface of the keypad module; wherein the base plate and the light pipe riser define a light path from the light receiving region to the light emission region, configured to receive light from the light emitter and emit the light at the light emission region; and a keypad assembly supported on the upper surface of the base plate, the keypad assembly including a plurality of keys exposed at the input surface of the keypad module.

Figure 1:
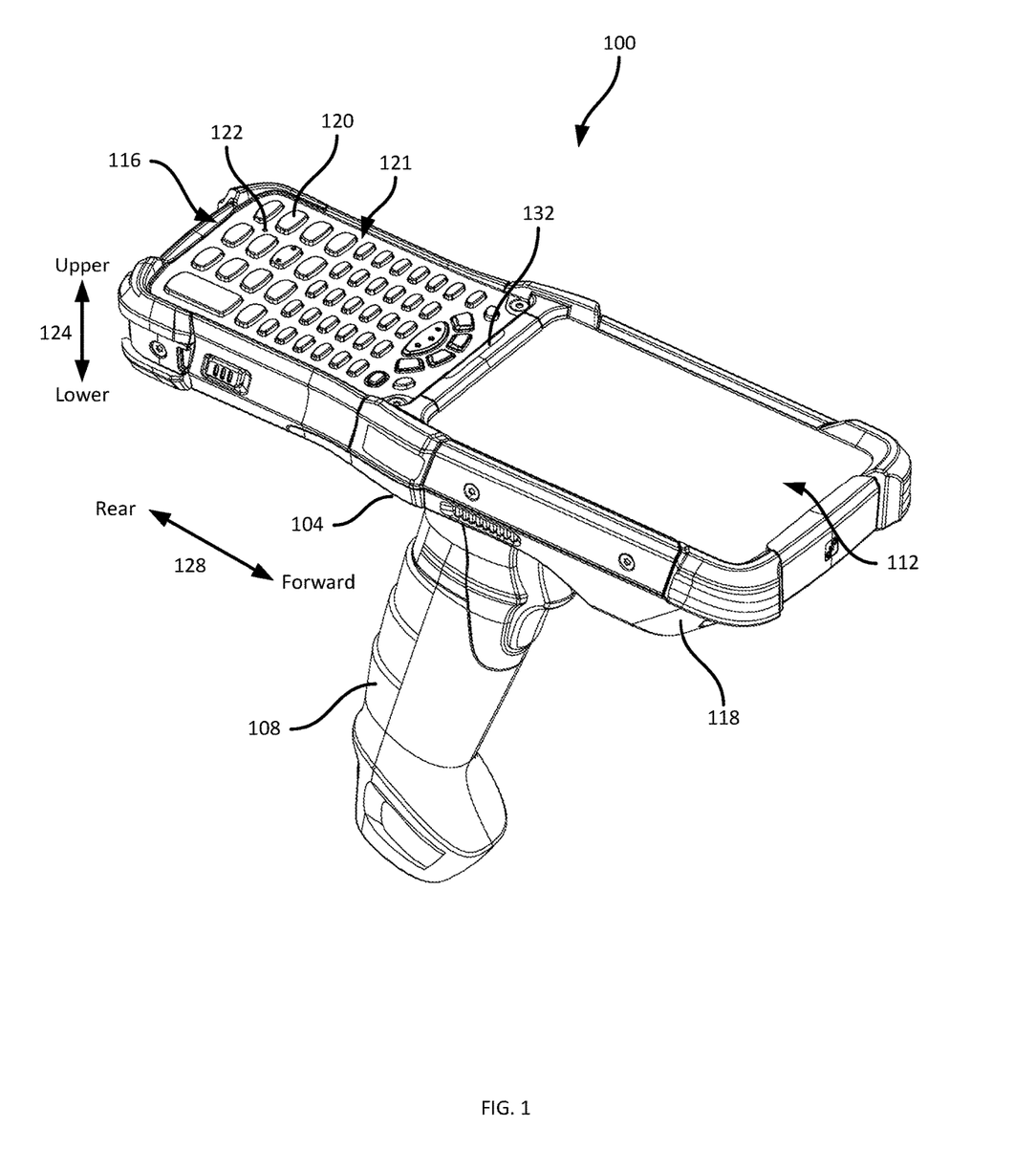
FIG. 1 is an isometric view of a mobile computing device.

FIG. 1 depicts a mobile computing device 100, which may be deployed in a wide variety of environments, including transport and logistics facilities (e.g. warehouses), healthcare facilities, and the like. The mobile device 100 in the example illustrated in FIG. 1. includes a housing including a body portion 104 and a grip portion 108. In the present example the grip 108 is a pistol grip, although in other examples the grip 108 can have various other configurations, or can simply be omitted.

The housing body 104 supports various components of the mobile device 100. Certain components, including microcontrollers, communication assemblies, and the like, are contained within the housing body 104 and are not exposed to the exterior of the mobile device 100 during use. Other components provide an operator interface of the mobile device 100, and are therefore at least partially exposed to the exterior of the mobile device 100. Such interface components include a display module 112 (e.g. including a touch screen) and a keypad module 116. As illustrated in FIG. 1, the display module 112 and the keypad module 116 are supported by the housing body 104 to expose surfaces thereof to the exterior of the mobile device 100, for access and manipulation by an operator of the mobile device 100. The mobile device 100 also includes further components, such as a data capture assembly 118 (e.g. a barcode scanner) mounted on the housing body 104.

More specifically, the keypad module 116 supports a plurality of keys 120 such that the keys 120 are exposed at an upper, or input, surface 121 of the keypad module 116. The keypad module 116 also includes, in the present example, a microphone aperture 122 at the input surface. The input surface 121 is defined by any components of the keypad module 116 that are exposed to an operator of the mobile device 100 when the mobile device 100 is in use (e.g. held by the grip 108, with the keys 120 and the display module 112 facing up towards the operator). The input surface 121 is therefore also referred to as an upper surface. Similar nomenclature is also used elsewhere in the discussion below, with the term "upper" indicating an orientation or position towards the input surface 121, and "lower' indicating an orientation or position away from the input surface 121 (e.g. in the general direction of the grip 108).

The terms "forward" and rear" are also employed in the discussion below. The term "forward" refers to a position or orientation towards the display module 112, while the term "rear' refers to a position or orientation away the display module 112. For clarity, the above-mentioned terms are indicated in FIG. 1 on corresponding axes 124 and 128.

As will be discussed below in greater detail, the keypad module 116 is modular, such that the keypad module 116 can be removed and replaced as a unit. Further, the keypad module 116 includes structural features to reduce or prevent the entry of contaminants such as dust, water and the like into the housing body 104 when the keypad module 116 is installed on the mobile device 100. Still further, certain of the above-mentioned structural features of the keypad module 116 also enable the keypad module 116 to act as a light pipe. The light pipe functionality of the keypad module 116 guides light from emitters such as light-emitting diodes (LEDs) within the housing body 104 to a light emission region 132 of the keypad module located at the input surface 121. The LEDs may be activated to emit light via the light emission region 132 in response to a variety of conditions, such as an in-progress scan by the data capture assembly 118, a low battery state detected by the mobile device 100. The above-mentioned LEDs may be activated in a plurality of colors to indicate additional conditions (e.g. the success or failure of a scan operation by the data capture assembly 118).

Figures 2A, 2B:
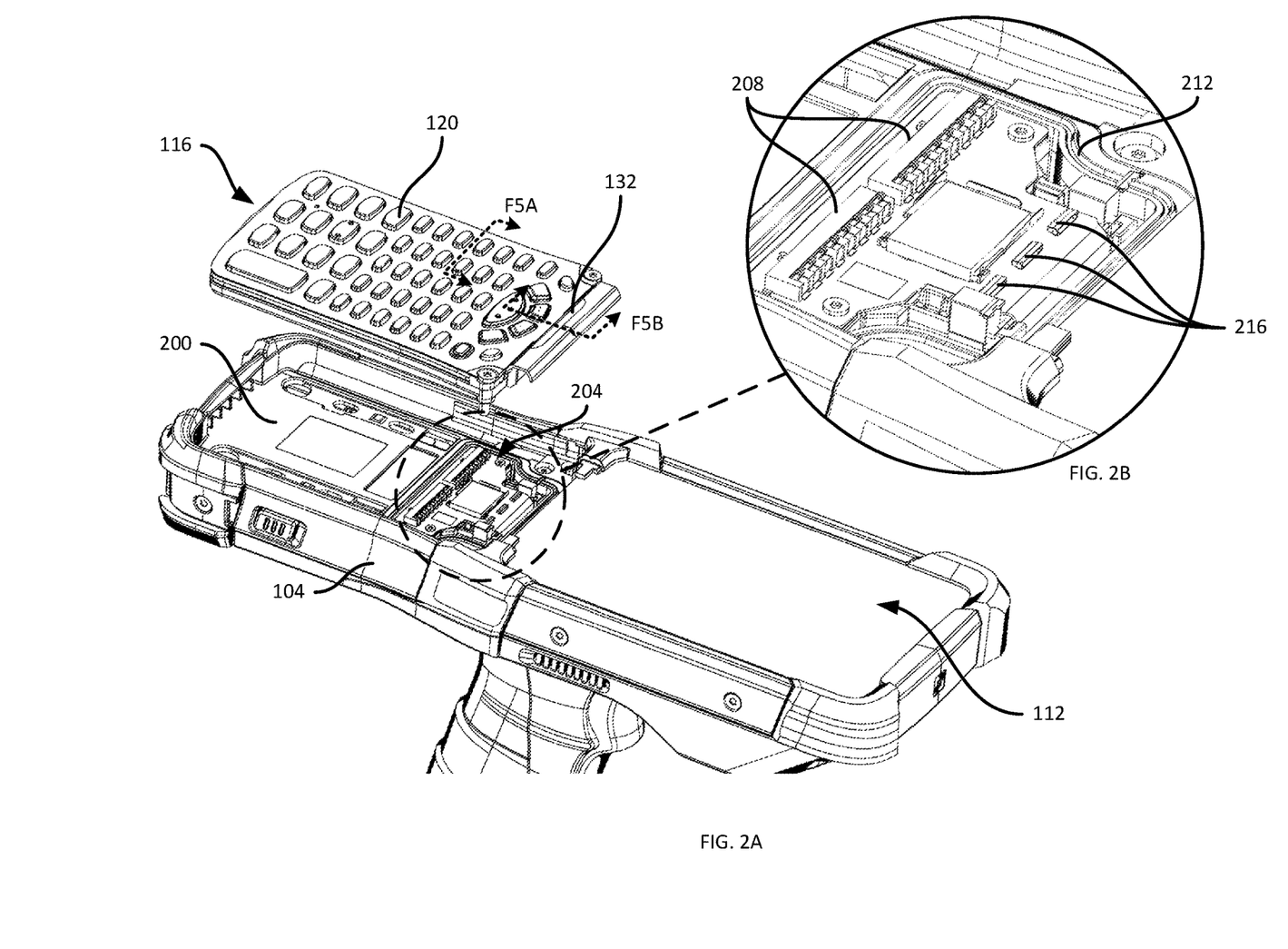
FIG. 2A is an isometric view of the mobile computing device of FIG. 1, with a keypad module removed.
FIG. 2B is detailed view of a keypad interface of the mobile computing device of FIG. 1.

Turning to FIG. 2A, the mobile device 100 is shown with the keypad module 116 removed. The housing body 104 defines a keypad seat 200, which may also be referred to as a keypad mount 200. The keypad module 116 and the keypad mount 200 can include any suitable mounting mechanisms for removably coupling the keypad module 116 to the housing body 104. Mounting mechanisms can include latches, screws, bolts, and the like.

The keypad mount 200 includes a keypad interface 204 to electronically connect certain components of the keypad module 116 to internal components of the mobile device 100, such as the above-mentioned microcontroller. The interface 204 is shown in greater detail in FIG. 2B. In particular, the interface 204 includes one or more electrical connectors 208 that engage with corresponding contacts of the keypad module 116, e.g. to receive signals representing key presses from the keypad module 116, for communication to the microcontroller. The interface 204 also includes a seal 212 (e.g. a gasket or the like) surrounding the interface 204, and that engages with a lower surface of the keypad module 116 to reduce or prevent entry of contaminants into the interface 204. Further, as will be discussed in greater detail below, the interface 204 includes at least one light emitter 216, such as an LED, mounted on a printed circuit board (PCB) or other substrate of the mobile device 100. In the present example, the interface 204 includes three LEDs 216. The LEDs 216 emit light that for capture by a light pipe structure of the keypad module 116 and emission at the light emission region 132.

Figure 3:
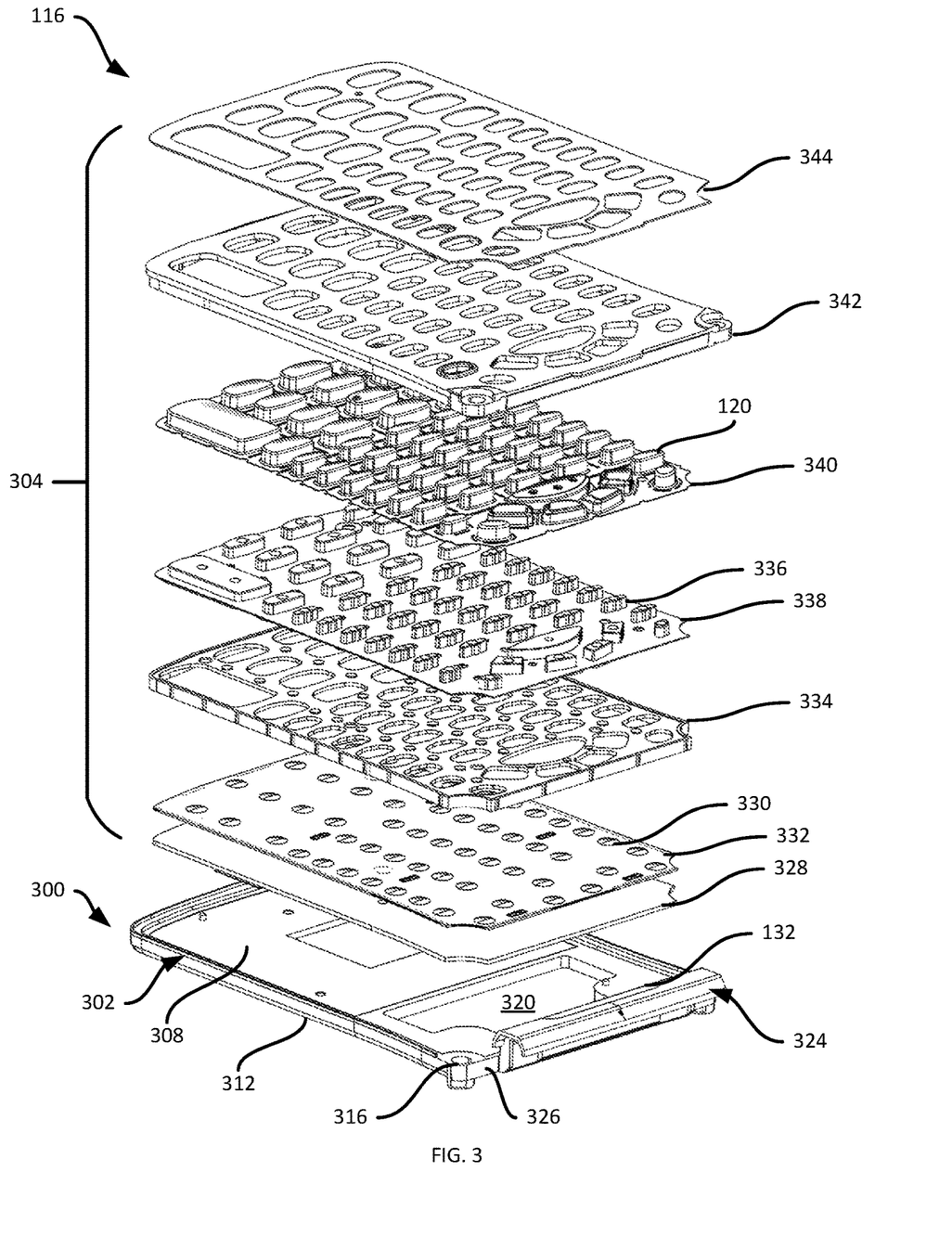
FIG. 3 is an exploded view of the keypad module of FIG. 2A.

Turning to FIG. 3, an exploded view of the keypad module 116 in isolation is shown. The keypad module 116, as shown in FIG. 3, includes a base member 300 and a keypad assembly 304. The base member 300 includes a base plate 302 with an upper surface 308 upon which the components of the keypad assembly 304 are supported. The base plate 302 also includes a lower surface 312 opposite the upper surface 308. The lower surface 312 corresponds to the lower surface of the keypad module 116, and engages the keypad seat 200 noted above, as well as any mounting structures provided on the keypad mount 200. To that end, for example, the base plate 302 includes apertures 316 for receiving bolts, screws or the like that engage corresponding apertures in the keypad mount 200. The base plate 302 also includes an opening 320 therethrough to enable engagement of the above-mentioned interface 204 with components of the keypad assembly 304, as will be discussed below. The seal 212 shown in FIG. 2B engages the lower surface 312 of the base plate 302 around the opening 320 when the keypad module 116 is installed on the keypad mount 200.

The base member 300 also includes a light pipe riser 324 extending from the base plate 302 and defining the light emission region 132 mentioned above. In the present example, the light pipe riser 324 extends upwards from a forward edge 326 of the base plate 302, to place the light emission region 132 at the input surface 121 of the keypad module 116, as shown in FIGS. 1 and 2A. Additional features of the base member 300 will be discussed further below.

The above-mentioned keypad assembly 304 includes various components that support the keys 120 and to capture and convey key presses (e.g. depressions of the keys 120 by an operator of the mobile device 100) to the microcontroller of the mobile device 100 via the interface 204. In the present example, the keypad assembly 304 includes a detection subassembly that detects and communicate the above-mentioned keypresses. The detection subassembly includes a PCB 328 including circuitry that engages with the connectors 208 of the interface 204. The detection subassembly also includes a plurality of switches 330 (e.g. metal dome switches) mounted on a suitable substrate 332. The substrate 332 can include, for example, a light guide film (LGF) to backlight the keypad.

The keypad assembly 304 further includes a frame 334 that supports a plurality of flexible buttons 336 on a substrate layer 338. In some examples, the buttons 336 and the substrate 338 are formed as a single piece of silicon rubber. As will now be apparent, depression of a button 336 transmits a force via a corresponding opening in the frame 334 to a dome switch 330 and subsequently to the PCB 328.

The keypad assembly 304 also includes a flexible key cover 340 defining the above-mentioned keys 120. In other embodiments, the key cover 340 can be provided as two or more distinct key covers. As will be apparent, depression of a button 336 is achieved by depressing the key 120 placed above the button 336. Finally, the keypad assembly 304 includes a bezel 342 having openings corresponding to each of the keys 120, to permit exposure of the keys 120 at the input surface 121 of the keypad module 116. The keypad assembly 304 can also include an overlay layer 344 affixed on the upper surface of the bezel 342. The overlay 344 also includes openings permitting exposure of the keys 120 at the input surface 121, and can include graphics, text, or the like, and can also be omitted in other examples. Assembly of the components of the keypad assembly 304 and the base member 302 will be discussed in greater detail below.

Figure 4A:
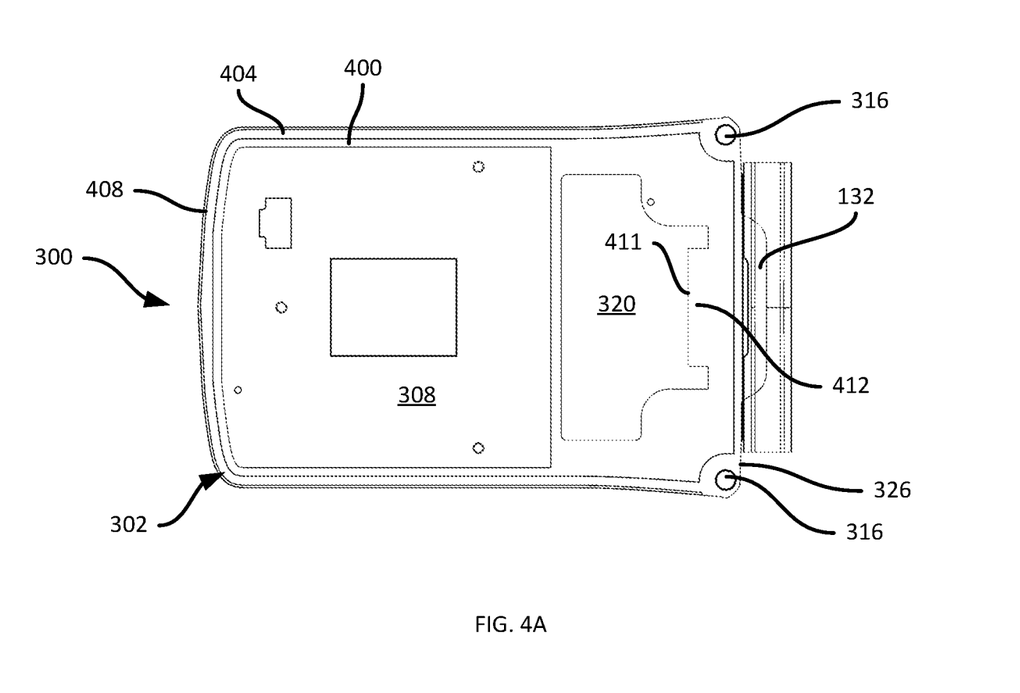
FIG. 4A is a top view of a base member of the keypad module of FIG. 3.
Figure 4B:
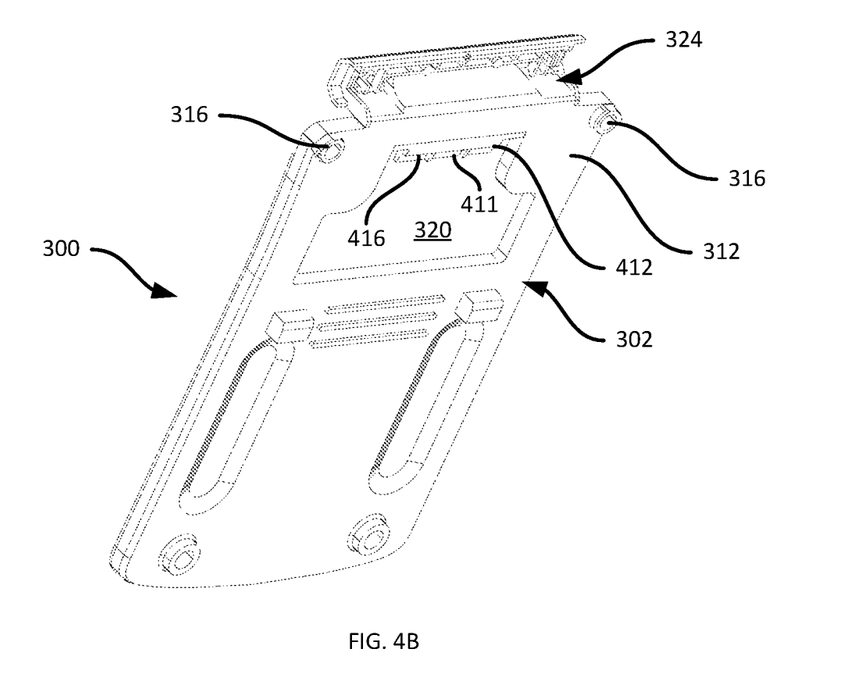
FIG. 4B is an isometric view of the base member of the keypad module of FIG. 3.

Turning to FIGS. 4A and 4B, certain additional features of the base member 300 will be discussed in greater detail. In particular, FIG. 4A illustrates a top view of the base member, in which the upper surface 308 and the opening 320 are visible. In addition, the base plate 302 includes an inner perimeter 400 and an outer perimeter 404 on the upper surface 308. The inner and outer perimeters 400 and 404 may be raised relative to the remainder of the upper surface 308. In other examples, however, the inner and outer perimeters 400 and 404 can be coplanar with the remainder of the upper surface 308. The inner perimeter 400 seals with the frame 334 to protect certain components of the keypad module 116 from environmental contamination, and the outer perimeter 404 bonds with the bezel 342 to provide structural rigidity to the keypad module 116. The outer perimeter 404 can be surrounded, as in the illustrated example, with an outer rim 408. The base plate 302 also includes, adjacent to the opening 320 (more specifically, adjacent to a forward edge 411 of the opening 320), a light receiving region 412.

FIG. 4B illustrates the base member 300 from below, such that the lower surface 312 is visible. As shown in FIG. 4B, the light receiving region 412 includes at least one cavity 416 that receives an emitter 216. Thus, in the illustrated example, the light receiving region 412 includes three cavities 416, each corresponding to a different one of the three emitters 216 shown in FIG. 2B. The light receiving region, at least a portion of the base plate 302, and at least a portion of the light pipe riser 324, are transparent (or at least translucent) to permit the passage of light from the light receiving region 412 to the light emission region 132.

Figure 5A:
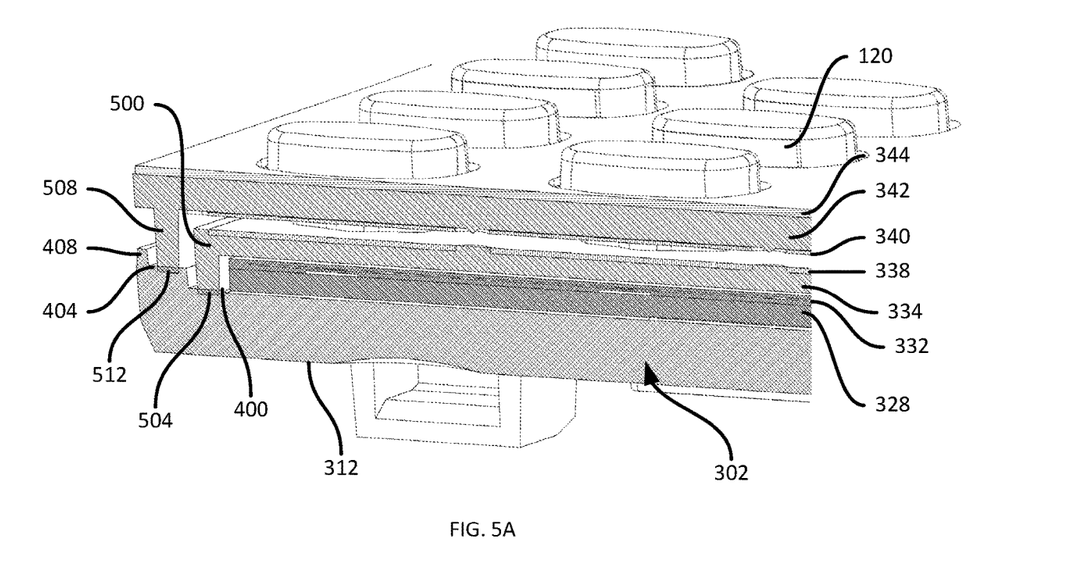
FIG. 5A is a partial cross-section of the keypad module of FIG. 2A.

Turning now to FIG. 5A, certain aspects of the assembly of the keypad module 116 will be discussed in greater detail. FIG. 5A illustrates a partial cross section of the keypad module 116, taken at the portion of the keypad module 116 indicated as "F5A" in FIG. 2A. The keypad module 116 is assembled by placing the detection subassembly (i.e. the PCB 328 and dome switch substrate 332 in the present example) on the upper surface 308 of the base plate 302. The frame 334 is then placed over the PCB 328 and dome switch substrate 332, to encapsulate the detection subassembly against the base plate 302. Of particular note, the frame 334 includes a mounting wall 500 extending continuously from the perimeter of the frame 334. The wall 500 is configured for placement against the inner perimeter 400 of the base plate 302. Further, the base plate 302 is transparent, allowing the mounting wall 500 to be welded, e.g. via a laser welding process from below the lower surface 312, to the inner perimeter 400 at a weld region 504.

The substrate 338 carrying the buttons 336 is sealed to an upper surface of the frame 334, e.g. by over-molding. As will now be apparent, the sealing of the substrate 338 to the frame 334, as well as the weld between the wall 500 and the inner perimeter 400, seals the detection subassembly between the frame 334 and the base plate 302, such that the detection subassembly is only exposed to the exterior of the keypad module 116 at the opening 320. As will now be apparent to those skilled in the art, the seal 212 (shown in FIG. 2B) prevents ingress of contaminants through the opening 320 when the keypad module 116 is installed. Therefore, the detection subassembly is substantially isolated from contaminants when the keypad module 116 is installed in the device 100.

The key cover 340 is arranged to cover the buttons 336 and mounted to the lower surface of the bezel 342 (e.g. via adhesives, by over-molding, or the like). In some examples, the key cover 340 need not be affixed to the bezel 342, and can instead simply be placed over the buttons 336, with the bezel 342 then placed over the key cover 340. The bezel 342 is the mounted to the base plate 203. To that end, the bezel 342 also includes a mounting wall 508 extending continuously from a perimeter of the bezel 342, for welding (e.g. via laser weld) to the outer perimeter 404 to form a welded region 512.

As noted above, the base plate 302 is fabricated from a transparent or translucent material (e.g. a transparent plastic) to enable the use of a welding process to bond the frame 334 and the bezel 342 to the base plate 302. The base plate 302, along with the light pipe riser 324, therefore also collects and directs light therethrough for emission at the light emission region 132.

Figure 5B:
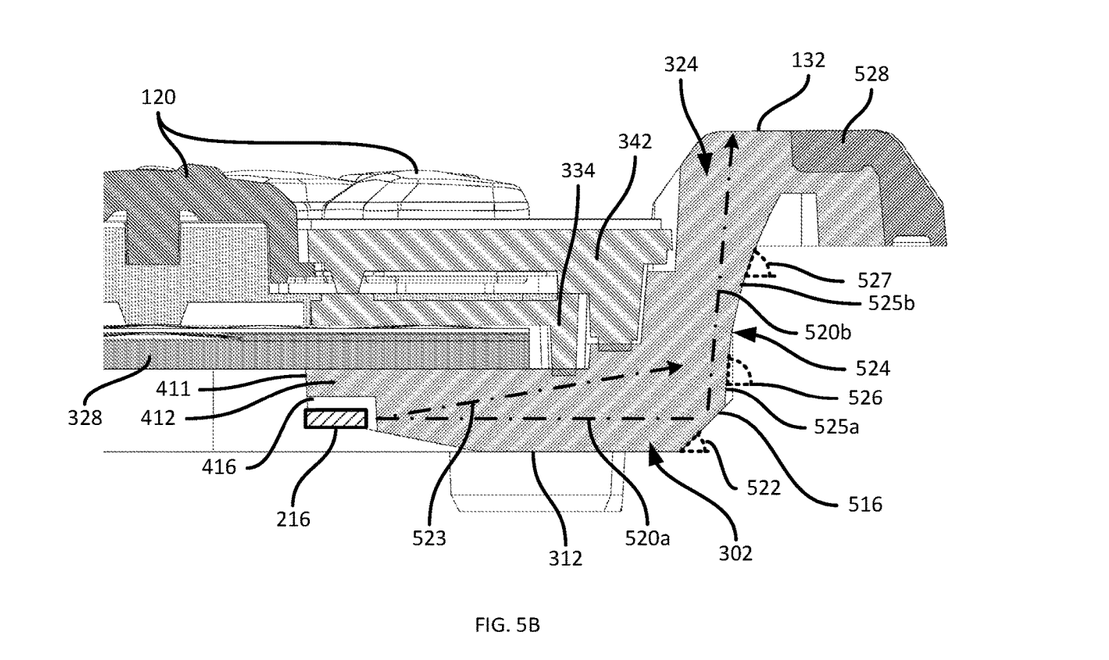
FIG. 5B is a further partial cross-section of the keypad module of FIG. 2A.

Turning to FIG. 5B, a further partial cross-section of the keypad module 116 is illustrated, taken at the portion of the keypad module 116 indicated as "F5B" in FIG. 2A. As shown in FIG. 5B, when the keypad 116 is installed in the device 100, an emitter 216 is received within each of the cavities 416 of the light receiving region 412. The forward edge 411 of the opening 320 is also visible in FIG. 5B. Light emitted by the emitter 216 is therefore transmitted into the transparent material of the base plate 302 at the light receiving region 412. At least a portion of the light from the emitter 216 travels through the base plate 302, and reflects internally, e.g. on an angled surface 516 at the base of the light pipe riser 324, along a light path 520 including an emitted segment 520a and a reflected segment 520b towards the light emission region 132. The emitted segment 520a travels towards the angled surface 516, and the reflected segment 520b travels from the angled surface 516 towards the emission region 132. The angle 522 of the surface 516 is selected to reflect light emitted from the emitter 216 towards the emission region 132. In the present example, the angle of the surface 516 relative to the incoming light from the emitter is about 45 degrees relative to the lower surface 312 of the base plate 302 (and to the light path segment 520a). As will be apparent to those skilled in the art, various other angles can also be employed for the surface 516 to accommodate variations in the position of the emission region 132 relative to the emitter 216.

As will be apparent to those skilled in the art, the light emitted by the emitter 216 into the base plate 302 does not all travel exactly along the segment 520a of the light path. That is, the light from the emitter 216 may travel along other paths, such as a path 523 illustrated in FIG. 5B, bypassing the angled surface 516 and impacting a forward surface 524 of the light pipe riser 324. The forward surface 524 is therefore also angled to reflect light arriving via such other paths towards the emission region 132. In the example illustrated in FIG. 5B, the angle of the forward surface 524 varies (e.g., decreases, relative to the lower surface 312, towards the emission region 132) continuously from a lower portion 525a to an upper portion 525b. In the illustrated example, the portion 525a has an angle 526 relative to the lower surface 312 of about 85 degrees, while the portion 525b has an angle 527 of about 70 degrees relative to the lower surface 312. In other embodiments, the forward surface 524 can include a plurality of discrete segments oriented at different angles relative to the lower surface 312.

The base member 300 can include an internally reflective coating on the lower surface 312, as well as on the forward surface 524 of the light pipe riser 324 and the angled surface 516. For example, the lower surface 312 and the forward surface 524 can include an inner layer of light-colored (e.g. white) paint, and an outer layer of opaque (e.g. black) paint. The forward surface 524 can be angled to internally reflect any light from the emitter 216 that is not fully redirected towards the emission region 132 by the angled surface 516. In the present example, as shown in FIG. 5B, the angle of the forward surface 524 changes progressively from the angled surface 516 towards the emission region 132. In other examples, the forward surface 524 has a plurality of discrete surfaces at different angles, rather than the continuous change in angle (i.e. curving) shown in FIG. 5B.

The base member 300 also includes, as shown in FIG. 5B, an opaque cap 528 at an upper end of the light pipe riser 324. As shown in FIGS. 1 and 2A, the forward edge of the keypad module 116 lies adjacent to a rear edge of the display module 112 when the keypad module 116 is installed. The cap 528 prevents light from the emitters 216 from leaking into the display module 112 via internal reflection at the light emission region 132. The cap 528 further restricts the emission of light to a region in which the distribution of light from the emitters 216 is even.

Figure 6:
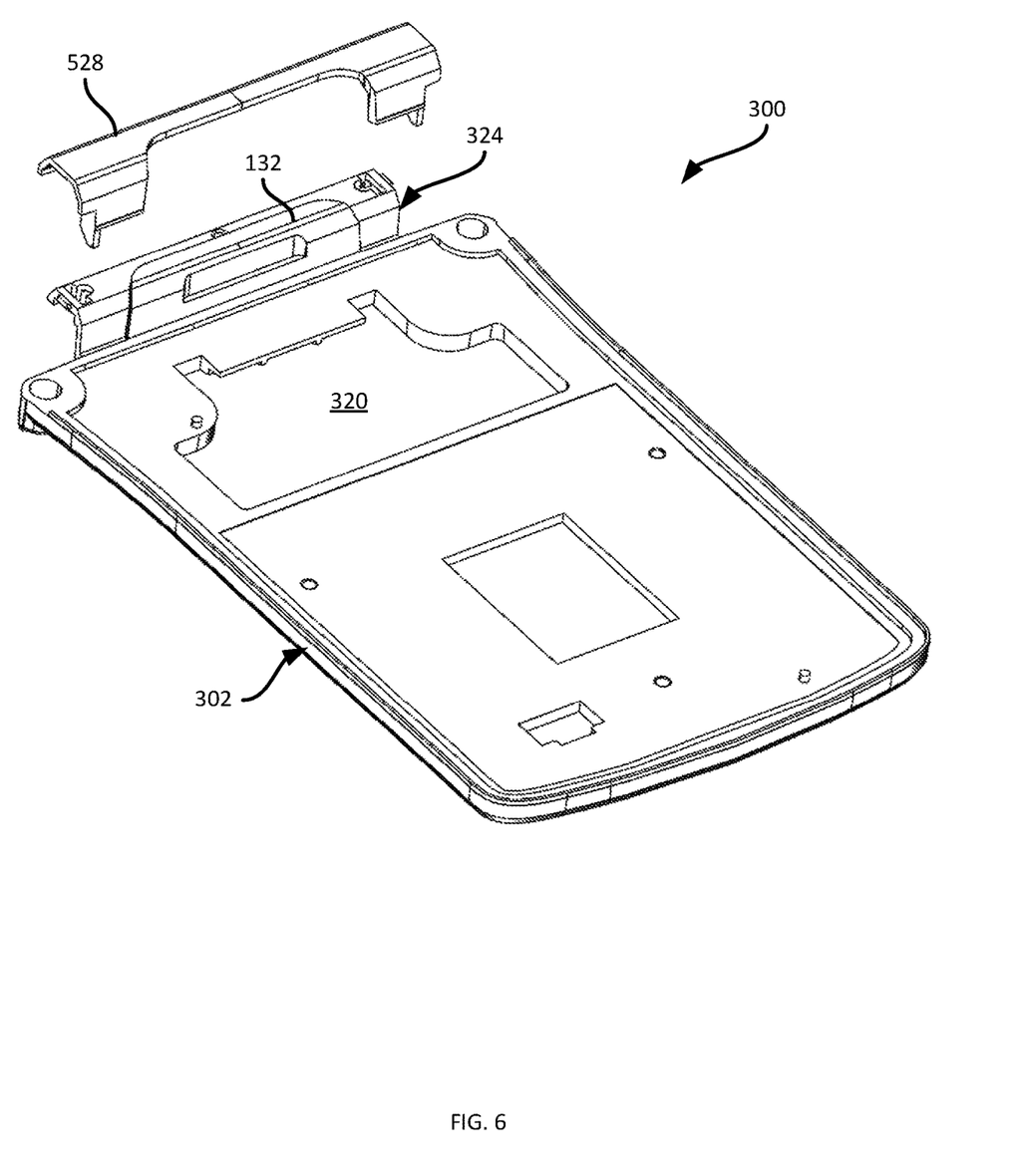
FIG. 6 is an exploded view of the base member of FIG. 4A.

The base member 300 can be fabricated in an injection molding process. For example, as shown in FIG. 6, the base plate 302 and light pipe riser 324 can be fabricated in a first molding operation, and the cap 528 can be over-molded onto the light pipe riser 324 in a second molding operation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:
1. A keypad module for a mobile computing device, the keypad module comprising:
 a base member including:
  a base plate having (i) a lower surface configured to engage with a keypad mount of the mobile computing device, (ii) an opposing upper surface, and (iii) a light receiving region at the lower surface;

a light pipe riser extending from the base plate to an input surface of the keypad module and having a light emission region at the input surface;

wherein the base plate and the light pipe riser define a light path from the light receiving region to the light emission region, configured to receive light from the mobile computing device and emit the light at the light emission region, and the base plate includes an opening configured to receive a keypad interface of the mobile computing device; and a keypad assembly supported on the upper surface of the base plate, the keypad assembly including a plurality of keys exposed at the input surface of the keypad module.

2. The keypad module of claim 1, wherein the light pipe riser extends from a forward side of the base plate.

3. The keypad module of claim 1, wherein the base plate and the light pipe riser are transparent.

4. The keypad module of claim 1, wherein the base member further comprises an opaque cap at an upper end of the light pipe riser and surrounding the light emission region.

5. The keypad module of claim 1, wherein the lower surface of the base plate, an angled surface of the light pipe riser, and a forward surface of the light pipe riser include internally reflective coatings along the light path.

6. The keypad module of claim 1, wherein
the keypad assembly includes a connector configured to engage with the keypad interface via the opening.

7. The keypad module of claim 6, wherein the light receiving region is adjacent to the opening.

8. The keypad module of claim 7, wherein the light receiving region includes a cavity in the lower surface, configured to receive a light emitter connected to the keypad interface of the mobile computing device.

9. The keypad module of claim 1, wherein the keypad assembly includes:
a detection subassembly configured to detect key presses and transmit key presses to the mobile computing device;
a frame joined to the base plate at an inner perimeter to encase the detection subassembly; and
a bezel supporting the plurality of keys and joined to the base plate at an outer perimeter.

10. The keypad module of claim 9, wherein the frame is joined to the base plate via a first laser weld, and the bezel is joined to the base plate via a second laser weld.

11. The keypad module of claim 1, wherein the light pipe riser includes an angled surface extending from the lower surface of the base plate, and wherein the angled surface is configured to receive light from the light receiving region and reflect the received light towards the light emission region.

12. The keypad module of claim 11, wherein the light pipe riser further includes a forward surface extending from the angled surface towards the light emission region.

13. The keypad module of claim 12, wherein the forward surface has, relative to the base plate lower surface, at least a first angle adjacent to the angled surface, and a second angle adjacent to the light emission region.

14. The keypad module of claim 13, wherein the first angle is greater than the second angle.

15. A keypad module for a mobile computing device, comprising:
a base member including a base plate having (i) a lower surface configured to engage with a keypad mount of the mobile computing device, (ii) an opposing upper surface, (iii) an opening configured to receive a keypad interface of the mobile computing device, and (iv) a light pipe riser extending from the base plate and having a light emission region at an input surface of the keypad module;
a keypad assembly supported on the upper surface of the base plate, the keypad assembly including:
a detection subassembly configured to engage with the keypad interface via the opening in the base plate for communicating detected key presses to the keypad interface;
a frame joined to an inner perimeter of the base plate surrounding the detection subassembly to encase the detection subassembly;
a plurality of buttons sealed to an upper surface of the frame for exposure to an input surface of the keypad module; and
a bezel joined to outer perimeter of the base plate surrounding the frame, and including a set of openings for the plurality of buttons.

16. The keypad module of claim 15, wherein the frame is joined to the inner perimeter via a first laser weld, and wherein the bezel is joined to the outer perimeter via a second laser weld.

17. The keypad module of claim 16, wherein the keypad assembly further includes a flexible key cover defining the plurality of keys, supported by the bezel.

18. The keypad module of claim 16, wherein the plurality of buttons are co-molded onto the frame.

19. The keypad module of claim 16, wherein the base plate includes a light receiving region at the lower surface; and
wherein the base plate and the light pipe riser define a light path from the light receiving region to the light emission region, configured to receive light from the mobile computing device and emit the light at the light emission region.

* * * * *